Patented Sept. 3, 1946

2,407,001

UNITED STATES PATENT OFFICE 2,407,001

SUGAR DERIVATIVES

William C. Griffin, Tamaqua, Pa., assignor to Atlas Powder Company, Wilmington, Del., a corporation of Delaware No Drawing. Application July 16, 1943,
Serial No. 494,973

17 Claims. (Cl. 260—209)

The present invention relates to improvements in sugar derivatives and compositions containing the same.

An object of the invention is to provide a process for making sugar derivatives and compositions containing them.

Another object of the invention is to provide new compositions of sugar derivatives.

Other objects will become apparent in the course of the following description.

In accordance with the present invention, it has been found that sugars containing from 5 to 6 carbon atoms can be reacted with glycols with 2 to 3 carbon atoms and the dihydric inter-ethers thereof with not more than 6 carbon atoms in the presence of strong mineral acid condensing agents and at elevated temperatures to produce novel and useful compositions. Suitable sugars for the process are, for example, glucose, fructose, galactose, inverted sucrose, and xylose. Suitable gylcols include ethylene glycol, di-ethylene glycol, tri-ethylene glycol, propylene glycols, di-propylene glycols, and hydroxy ethyl ethers of propylene glycols. Suitable catalysts are the strong mineral acids such as sulphuric acid, hydrochloric acid, iodine (which decomposes to give iodine acids in the reaction) and aryl sulphonic acids. Of these catalysts, sulphuric acid is preferred.

The reaction is conducted by mixing approximately equimolecular proportions of the sugar and glycol and a small amount, for example 0.03 to 0.2% of the catalyst, based on the total weight of the sugar and glycol. The reactants are heated to a temperature sufficient to cause the reaction mixture to clear and not over about 140° C., under a reflux condenser or in a closed vessel which prevents the escape of volatile reactants and reaction products. In the case of most of the reaction mixtures, the clearing temperature is in the neighborhood of 120° C. Lower temperatures can be employed, but it has been found that better products can be made and the process is more practical at the preferred operating temperatures. The catalyst can be added to the glycol or glycol ether and the sugar thereafter added to the solution. Preferably, however, the sugar and glycol or glycol ether are mixed together and heated until the mixture clears and then the catalyst is added.

Under these operating conditions, the reaction comes to an equilibrium in which a minor portion of reducing sugar remains as indicated by a test, for example, with Fehling's solution. In the case of glucose and propylene or di-ethylene glycol, about 9 to 15% reducing sugar remains when equilibrium is reached.

The reaction product is preferably treated by neutralizing the acidic catalyst by means of suitable alkaline materials, and any precipitate resulting therefrom is subsequently removed, as by decantation or filtration. Any soluble ions may be removed by the customary procedures, for example, treatment with ion-exchangers, selective adsorbents and the like. If necessary, the product can be further treated with bleaching agents or decolorizing carbon to improve the color if substantial darkening has occurred in the reaction. These purifying steps are not generally required, however, because the reaction product will be found suitable directly for most applications.

It is further possible to treat the product to remove the residual sugar. A suitable step for accomplishing this purpose is selective fermentation of the sugar.

The reaction product is a viscous, water-soluble, hygroscopic liquid. This composition has been found useful as a plasticizing and conditioning agent for the preparation of flexible glues, glue print roll compositions, and cork glue compositions. Other uses for the material are the conditioning of cellulosic materials in the form of sheets, films, threads, or the like. It is also useful as a conditioning agent for tobacco, gelatine products and other hydrophilic materials with which it can be incorporated.

The composition also is useful as a polyhydric material for the preparation of chemical derivatives such as esters, ethers, acetals and the like.

The following examples illustrate typical processes and compositions according to the invention.

Example I 180 parts by weight glucose (1 mol), and 83.6 parts by weight propylene glycol (1.1 mols), were placed together in a reaction vessel to which was attached a reflux condenser. The mixture was heated to the clearing temperature of about 120° C. and 0.05% iodine (based on total charge) was added. Thereafter, the temperature was raised to 130° C. The reaction proceeded rapidly with the evolution of water which was returned to the vessel from the reflux condenser. At the end of the reaction, the product was found to contain 12.8% reducing sugar. Water was added to the product to bring the water content to 15%. At 25° C. the composition, containing 15% water, was amber colored and had a viscosity of 5900 centipoises.

Example II 180 parts by weight glucose (1 mol), and 83.6 parts by weight propylene glycol (1.1 mols), were placed together in a reaction vessel to which was attached a reflux condenser. The mixture was heated to the clearing temperature (about 120° C.) and 0.05% concentrated $H_2SO_4$ (based on total charge) added in the form of a 50% aqueous solution. Thereafter, the temperature was raised to 130° C. and held at that value for 60 minutes. The reaction proceeded vigorously with the evolution of water which was returned to the reaction mixture from the reflux condenser. The product contained 13.8% reducible sugar. The water content was adjusted to 17.9%. Thereafter, 0.08% $NaHCO_3$ was added to neutralize the acid catalyst. The product was of light amber color and had a viscosity at 25° C. of 2120 centipoises.

Example III 180 parts by weight glucose (1 mol), and 116.6 parts by weight diethylene glycol (1.1 mols), were placed together in a reaction vessel to which was attached a reflux condenser. The mixture was heated to the clearing temperature of about 120° C. and 0.04% iodine (based on total charge) was added. The temperature was then raised to 125° C. and held at that value for 60 minutes. The reaction product, which contained 14.2% reducing sugar, was diluted with water to bring the water content to 11.6%. The solution was amber in color and had a viscosity at 25° C. of 6470 centipoises.

If it is desired to obtain products of lighter color, the reaction product can be treated with activated carbon or the like, preferably after diluting with water to a more readily filterable viscosity.

It will be noted that in the examples a 10% excess of glycol over the equimolecular amount is employed. This is not essential but has been found to facilitate the preparation of the products and to compensate for side reactions involving the glycol or glycol ether alone.

The products of these examples are non-crystallizing liquids which are soluble in water and in hydrophile solvents. They can be used directly for many conditioning or humectant applications.

The chemical composition of the reaction products is not definitely known, but they are believed to contain a mixture of the isomeric glycol or glycol ether glucosides of the sugar employed together with sugar self-condensation products.

The other products of the invention, namely those made from the other glycols or glycol ethers and sugars, can be prepared by processes similar to the foregoing.

What is claimed is:

1. A process for producing sugar derivatives which comprises heating a sugar containing from 5 to 6 carbon atoms with a compound of the class consisting of glycols with 2 to 3 carbon atoms and the dihydric inter-ethers of said glycols with not more than 6 carbon atoms, in substantially equimolecular proportions, in the presence of a strong mineral acid catalyst, said heating being conducted at a temperature sufficient to cause the reaction mixture to clear and not over about 140° C. and under conditions in which volatile reactants and volatile reaction products are retained in the reaction mixture, and continuing the heating until the reaction substantially reaches equilibrium.

2. A process which comprises reacting a sugar containing from 5 to 6 carbon atoms and a compound of the class consisting of glycols with 2 to 3 carbon atoms and the dihydric inter-ethers of said glycols with not more than 6 carbon atoms, in substantially equimolecular proportions, in the presence of a strong mineral acid catalyst, at a temperature of substantially 120 to 140° C., under refluxing conditions in which the volatile reactants and volatile reaction products are returned to the reaction mixture, and continuing the reaction substantially to equilibrium.

3. A process for producing sugar derivatives which comprises mixing a sugar containing from 5 to 6 carbon atoms with a compound of the class consisting of glycols with 2 to 3 carbon atoms and the dihydric inter-ethers of said glycols with not more than 6 carbon atoms, in substantially equimolecular proportions, heating said mixture to the clearing temperature to form a clear solution, adding a catalytic amount of a strong mineral acid to the clear solution, and reacting the sugar and said compound to substantial equilibrium in the presence of said acid and under conditions in which volatile reactants and volatile reaction products are retained in the reaction mixture.

4. A process for producing sugar derivatives which comprises mixing a sugar containing from 5 to 6 carbon atoms with a compound of the class consisting of glycols with 2 to 3 carbon atoms and the dihydric inter-ethers of said glycols with not more than 6 carbon atoms, in substantially equimolecular proportions, heating said mixture to the clearing temperature to form a clear solution, adding to the clear solution from 0.03 to 0.2% of sulphuric acid based on the total charge, and reacting the sugar and said compound to substantial equilibrium at a temperature not exceeding 140° C. in the presence of said acid and under conditions in which volatile reactants and volatile reaction products are retained in the reaction mixture.

5. A process which comprises heating glucose and a compound of the class consisting of glycols with 2 to 3 carbon atoms and the dihydric inter-ethers of said glycols with not more than 6 carbon atoms, in substantially equimolecular proportions in the presence of a strong mineral acid catalyst, said heating being conducted at a temperature sufficient to cause the reaction mixture to clear and not over about 140° C. and under conditions in which the volatile reactant and volatile reaction products are retained within the reaction mixture, and continuing the heating until the reaction substantially reaches equilibrium.

6. A process which comprises heating glucose and propylene glycol in substantially equimolecular proportions in the presence of a strong mineral acid catalyst, said heating being conducted at a temperature sufficient to cause the reaction mixture to clear and not over about 140° C. and under conditions in which the volatile reactant and volatile reaction products are retained in the reaction mixture, until the product contains not more than about 15% reducing sugar.

7. A process as in claim 4 wherein the said sugar is glucose and the said compound is propylene glycol.

8. A process which comprises heating glucose with di-ethylene glycol in substantially equimolecular proportions in the presence of a strong mineral acid catalyst, said heating being conducted at a temperature sufficient to cause the reaction mixture to clear and not over about 140° C. and under conditions in which the volatile reactant and volatile reaction products are retained in the reaction mixture, until the reaction product contains not more than about 15% reducing sugar.

9. A process as in claim 4 wherein the said sugar is glucose and the said compound is diethylene glycol.

10. As a new composition the reaction product produced by the process of claim 1.

11. As a new composition the reaction product produced by the process of claim 5, said composition being a viscous, water-soluble, hygroscopic liquid.

12. A composition comprising the reaction product produced by the process of claim 6, said composition being a viscous, water-soluble, hygroscopic liquid.

13. A composition comprising the reaction product produced by the process of claim 8.

14. A process for producing sugar derivatives which comprises mixing glucose and propylene glycol in substantially equimolecular proportions, heating said mixture to form a clear solution, adding a catalytic amount of a strong mineral acid to the solution, reacting the glucose and propylene glycol at from 120 to 140° C. under refluxing conditions until the product contains not more than about 15% reducing sugar, and adding an alkaline material to the product to neutralize the catalyst.

15. A composition comprising the reaction product produced by the process of claim 14.

16. A process for producing sugar derivatives which comprises mixing glucose and diethylene glycol in substantially equimolecular proportions, heating said mixture to form a clear solution, adding a catalytic amount of a strong mineral acid to the solution, reacting the glucose and diethylene glycol at from 120 to 140° C. under refluxing conditions until the product contains not more than about 15% reducing sugar, adding an alkaline material to the product to neutralize the catalyst.

17. A composition comprising the reaction product produced by the process of claim 16.

WILLIAM C. GRIFFIN.